(12) United States Patent
Wong et al.

(10) Patent No.: US 7,657,113 B2
(45) Date of Patent: Feb. 2, 2010

(54) AUTO-REGRESSIVE METHOD AND FILTER FOR DENOISING IMAGES AND VIDEOS

(75) Inventors: Hon Wah Wong, Hong Kong (CN); Andy Chang, Hong Kong (CN)

(73) Assignee: Hong Kong Applied Science and Technology Research Institute Co., Ltd., Hong Kong (CN)

(*) Notice: Subject to any disclaimer, the term of this patent is extended or adjusted under 35 U.S.C. 154(b) by 811 days.

(21) Appl. No.: 11/313,421

(22) Filed: Dec. 21, 2005

(65) Prior Publication Data

US 2007/0140587 A1    Jun. 21, 2007

(51) Int. Cl.
*G06K 9/40* (2006.01)
(52) U.S. Cl. ........................... 382/260; 348/618
(58) Field of Classification Search ............ 382/100, 382/162, 167, 254, 260, 261, 262, 263, 264, 382/265, 274, 275; 359/885–892; 348/610, 348/606, 625–631, 618
See application file for complete search history.

(56) References Cited

U.S. PATENT DOCUMENTS

| | | | | |
|---|---|---|---|---|
| 6,236,763 B1* | 5/2001 | Wong et al. | ............ | 382/261 |
| 6,728,416 B1* | 4/2004 | Gallagher | ............ | 382/265 |
| 7,123,783 B2* | 10/2006 | Gargesha et al. | ............ | 382/308 |
| 2002/0076117 A1* | 6/2002 | Allred et al. | ............ | 382/261 |
| 2003/0147556 A1* | 8/2003 | Gargesha et al. | ............ | 382/190 |
| 2003/0189655 A1* | 10/2003 | Lim et al. | ............ | 348/241 |

FOREIGN PATENT DOCUMENTS

| CN | 1138401 A | 12/1996 |
|---|---|---|
| CN | 1259823 A | 7/2000 |

OTHER PUBLICATIONS

International Search Report dated Mar. 29, 2007 for PCT/CN2006/003462 in 4 pages (which corresponds to U.S. Appl. No. 11/313,421).

* cited by examiner

*Primary Examiner*—Anand Bhatnagar
(74) *Attorney, Agent, or Firm*—Fulbright & Jaworski L.L.P.

(57) ABSTRACT

A method and apparatus for denoising digital images or videos, which is an extension of the spatial varying filter (SVF) by using a past filtered pixel, instead of the current pixel itself as the input for producing an output for the current pixel. Based on this concept, a number of denoising filters are provided, including Auto-regressive Spatial Varying Filter (ARSVF), Modified Auto-regressive Spatial Varying Filter (MARSVF), Auto-Regressive Spatiotemporal Varying Filter (ARSTVF) which is an extension of Spatiotemporal Varying Filter (STVF), Auto-regressive Motion Compensated Spatiotemporal Varying Filter (ARMCSTVF) which is extension of Motion Compensated Spatiotemporal Varying Filter (MCSTVF), and Selective Auto-regressive Motion Compensated Spatiotemporal Varying Filter (SARMCSTVF).

8 Claims, 15 Drawing Sheets

AUTO-REGRESSIVE METHOD AND FILTER FOR DENOISING IMAGES AND VIDEOS

FIELD OF THE INVENTION

The present invention relates to denoising technology for digital images and videos. Particularly, it relates to a method for denoising images and videos by employing an auto-regressive approach in combination with spatial varying or spatio-temporal filtering techniques.

BACKGROUND OF THE INVENTION

With the advance of computer and network technologies, digital images and videos have become commonplace in people's personal and professional life. Photographs taken with digital cameras and exchanged through email or cellular phones, video conferencing, digital TV broadcasting, pay-per-view Internet services, to name just a few, are getting more popular everyday. With their popularity, comes the attention to technologies for improving image and video's quality and reducing their size for easy transmission and exchange. Denoising is such a technology, which is a process taken to remove noise from digital images and videos and to enhance their compressibility.

Noise usually exists in uncompressed images and videos, which are unwanted or undesirable elements or artifacts. Noise can come from a variety of sources, for example, shot noise which originates in the electronic hardware, thermal noise, channel noise, etc. The existence of noise not only degrades the visual quality of video, it also decreases the performance of video coding and reduces the medium files' compressibility. It increases the entropy of the video such that more bits are needed to code the images and videos and also decreases the accuracy of motion estimation that further increases the bit rate. To increase the coding efficiency and compressibility, video denoising is necessary before encoding the video. The purpose of video denoising is to estimate the true image signals as accurately as possible. Many methods have been developed for image denoising such as low pass filtering, Wiener filtering, Kalman filtering or Spatial Varying filtering, most of which exploit the spatio-redundancy of the image to suppress noise. However, these filters are not optimized, especially for video denoising as the temporal redundancy of the video is not exploited. Some spatio-temporal filters are proposed for denoising where motion compensation is usually applied in order to exploit the temporal redundancy of moving objects. However, the computational complexity of these methods is too great for real time processing. Spatial Varying Filter (SVF) was proposed, which has relatively low computational demand and yet good edge preserving capability. SVF computes filter weights by the difference between current pixel and unfiltered neighboring pixels. Because SVF is a Finite Impulse Response (FIR) filter, the filter size is limited due to computational complexity. This constraint limits the noise suppression capability of the SVF technique as the order of the filter cannot be too large.

Some references are briefly commented in the following for purpose of providing background information.

U.S. Pat. No. 6,731,821 discloses an adaptive low pass filter to remove noise in digital video signals. The amount of low pass filtering depends on a local gradient measurement. The image is first filtered by a general low pass filter and then the filtered image is subtracted from the original image to give the residue image. The residue image is weighted according to local gradient measurement and added back to the filtered image to give the final image. However, the weighing of the neighboring pixels used in the low pass filter is not adaptive.

U.S. Pat. No. 6,665,448 discloses a filter which performs selective sharpening and smoothing of image data. The sharpening filter is derived from the selective smoothing filter. Unsharp masking is performed to enhance the edges. The purpose of the filter, however, is to enhance the visual quality of the image with enhanced edges which, in general, increase the bit rate.

U.S. Patent Application No. 20050036704 teaches a method of splitting an image into the foreground region and the background region and applying different anisotropic diffusion filters on each region. But, in general, a video scene is more complex than just two regions.

U.S. Patent Application No. 20050036558 teaches a method where pixel values between successive frames are filtered if the difference in the pixel values between successive frames is within threshold range, which is determined adaptively frame by frame. The use of fixed threshold within a frame nonetheless limits the performance of the filter.

U.S. Patent Application No. 20020172431 discloses a method for improving the appearance of the image while at the same time enhancing the compressibility of the image. It improves compressibility by selectively filtering the smooth regions and enhances the edges by applying an edge enhancement filter selected based on an edge analysis. However, the method only uses a limited set of filters.

U.S. Pat. No. 6,633,683 discloses a method to improve a well-known "least mean square method" by locally segmenting the pixels to the homogeneous region and edge region and estimating the local mean and variance using the data only from the homogeneous region. This method, however, requires the knowledge of noise variance to give good performance and it is for handling Gaussian noise.

SUMMARY

Certain embodiments provide an efficient denoising filter for adaptively reducing spatial noise in both homogeneous and high texture regions in a way that does not sacrifice picture details and does not demand too heavy computational power to render them practical for real-time processing. Certain embodiments to provide a set of denoising filters that are computationally highly efficient, have good noise reduction power and are capable of preserving edge details.

In one embodiment, there is provided an auto-regressive denoising method, which is applicable to digital images or digital video frames. The method includes an act of producing a filtered output for a current pixel of the digital image or video frame using past filtered pixels as an input, rather than inputting the original pixels themselves. The filtered output represents a weighted sum of the past filtered pixels and future original pixels. The weights are calculated by using a function of absolute pixel difference between current pixel and a set of neighboring pixels. There are further provided a set of denoising filters as particular embodiments. Those filters are: Auto-regressive Spatial Varying Filter (ARSAV), Modified Auto-regressive Spatial Varying Filter (MARSVF), Spatiotemporal Varying Filter (STVF), Auto-Regressive Spatiotemporal Varying Filter (ARSTVF), Motion Compensated Spatiotemporal Varying Filter (MCSTVF), Auto-regressive Motion Compensated Spatiotemporal Varying Filter (ARMCSTVF), Selective Auto-regressive Motion Compensated Spatiotemporal Varying Filter (SARMCSTVF).

The various features of novelty which characterize the embodiments are pointed out with particularity in the claims annexed to and forming a part of this disclosure. For a better

DETAILED DESCRIPTION OF PARTICULAR EMBODIMENTS

SVF

The present method and system is an extension and an improvement of the existing SVF (spatial varying filter) disclosed in "Fast ad-hoc Inverse Halftoning using Adaptive Filtering", *Proc. Of IEEF int. Conf on Acoustics, Speech Processing*, Vol. 6, pp. 2279-2282, March 1999. The publication (the SVF paper hereinafter) is incorporated herewith in its entirety for the purpose of providing background information to appreciate the subject matter of the present method and system.

The SVF filter is based on a set of calculations using Equations (1)-(4) as provided below. In Equation (1), the filtered output y(i, j) is weighted sum of the input x(i, j) and the neighboring pixels. This filter can be applied on luminance and chrominance pixels.

$$y(i, j) = \sum_{(k,l) \in N} a(i+k, j+l) \cdot x(i+k, j+l) \quad (1)$$

Where x(i,j) is the (i,j)$^{th}$ pixel of the image, a(i+k,j+l) is a spatial varying filter coefficient, which is determined by the function of absolute pixel difference using Equation (2)-(4), and N is a set of neighboring pixels.

$$w(i+k,j+l)=f(|x(i,j)-x(i+k,j+l)|), (k,l) \in N \quad (2)$$

$$a(i+k, j+l) = \frac{w(i+k, j+l)}{\sum_{(k,l) \in N} w(i+k, j+l)}, (k, l) \in N \quad (3)$$

Equation (3) is used to normalize the filtered coefficients such that the average intensity is preserved. While there are many numerous possible definitions for $f$ in Equation (2), the simplest one defined in the SVF paper referenced as the "polynomial map" is chosen:

$$f(i) = \left(1 - \frac{i}{255}\right)^k \quad (4)$$

Figure 5:
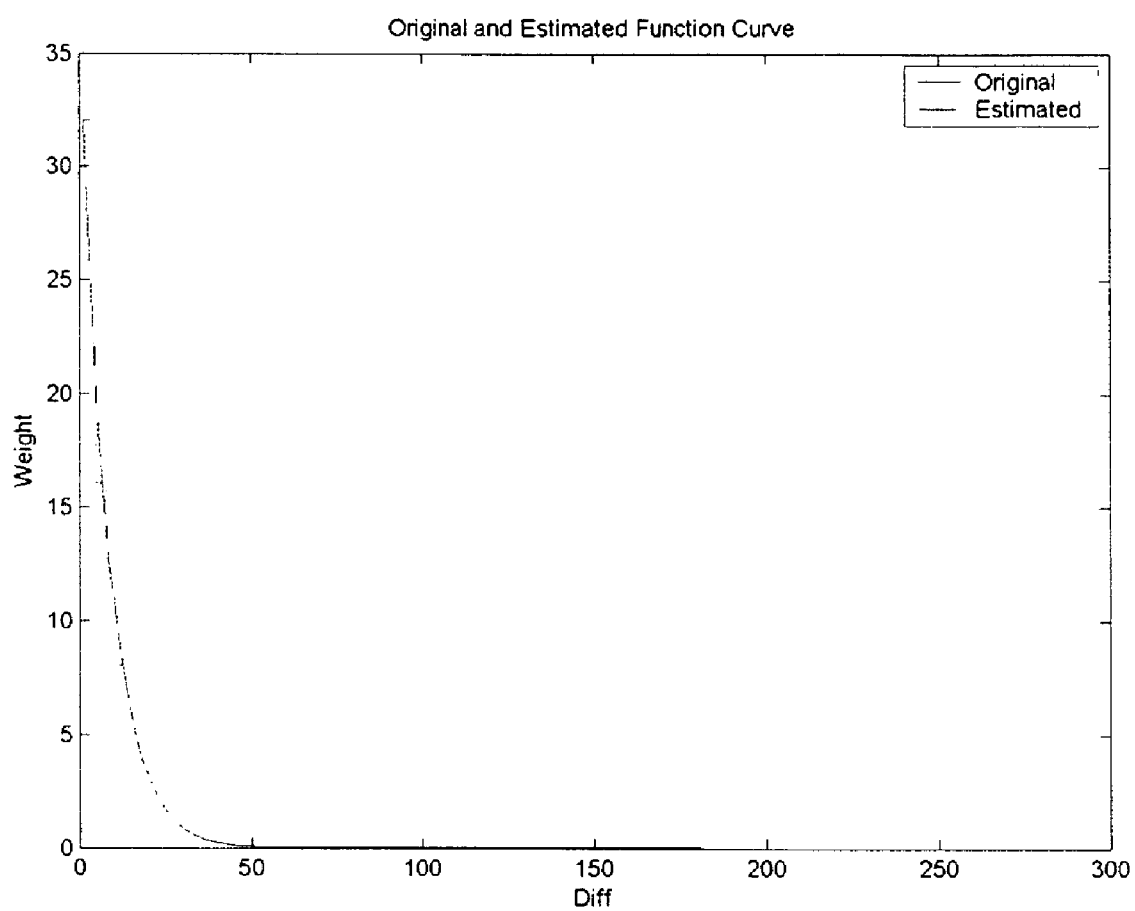
FIG. 5 is a comparison between weight curves obtained by full calculation and by a simplified estimation.

Many possible values of k have been tried in simulations on the testing videos and it is found that k=30 is a good value for all the videos tested. Of course, a person of ordinary skill may use other values to obtain satisfactory results for a given video under particular circumstances. The main feature of SVF is that the edges can be preserved as the weights of neighboring pixels with large difference with current pixels will be suppressed significantly. The mapping function $f$ with k=30 is shown in FIG. 5. As shown, the weights are inversely proportional to the absolute difference between the current pixel and the corresponding neighboring pixels. When edge exists between current pixel and a particular neighboring pixel, the absolute difference is large and the weight of this neighboring pixel is extremely small according to the function in Equations (2)-(4) and the edge can be preserved.

Auto-Regressive Spatial Varying Filter (ARSVF)

SVF is basically a FIR filter. As such, the filter size is limited due to heavy computation requirement. This in turn limits SVF's noise suppression capacity as the order of the filter cannot be too large. To increase the flexibility of the filter, the present invention applies an autoregressive filtering technique to SVF, resulting in a type of filter referred to as ARSVF. Unlike SVF where an unfiltered future pixel is used as the input of the filter, ARSVF uses a past filtered pixel as input for computing the filter weight. Filtered pixels are less noisy and thus are more reliable, whereby reducing computational complexity and reducing the memory requirement. For SVF, the original pixel should be kept in the memory to be used as the input, while for ARSVF filtered pixels are used as the input and there is no need to keep the original pixel in the memory. The filtered output y(i,j) using ARSVF is calculated by Equations (5)-(7).

$$y(i, j) = \sum_{\substack{(k,l) \in N, \\ (k,l)<(0,0)}} a(i+k, j+l) \cdot y(i+k, j+l) + \quad (5)$$

$$\sum_{\substack{(k,l) \in N, \\ (k,l)<(0,0)}} a(i+k, j+l) \cdot x(i+k, j+l)$$

$$w(i+k, j+l) = \begin{cases} f(|x(i, j) - y(i+k, j+l)|), & (k, l) < (0, 0) \\ f(|x(i, j) - x(i+k, j+l)|), & (k, l) \geq (0, 0) \end{cases} \quad (6)$$

$$a(i+k, j+l) = \frac{w(i+k, j+l)}{\sum_{(k,l) \in N} w(i+k, j+l)} \quad (7)$$

Figure 1:
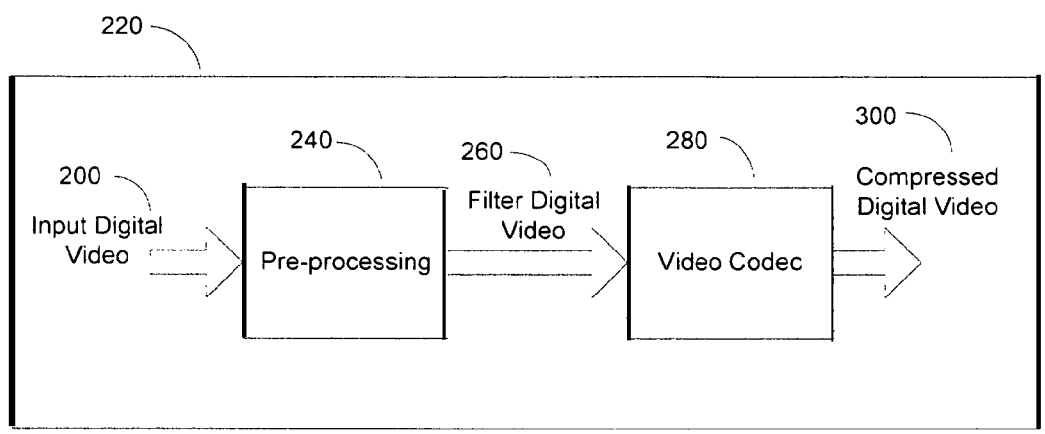
FIG. 1 is a block diagram of a video compression system according to one embodiment.

Referring to FIG. 1, which is a block diagram of a video compression system 220, an original digital video signal (input 200) is fed to a pre-processing module 240 where the signal subjects to ARSVF treatment to output a filtered video signal 260 with enhanced quality and better compressibility. The filtered video signal is then fed to a video codec 280 to output a final video signal 300 with a reduced size.

Figure 2:
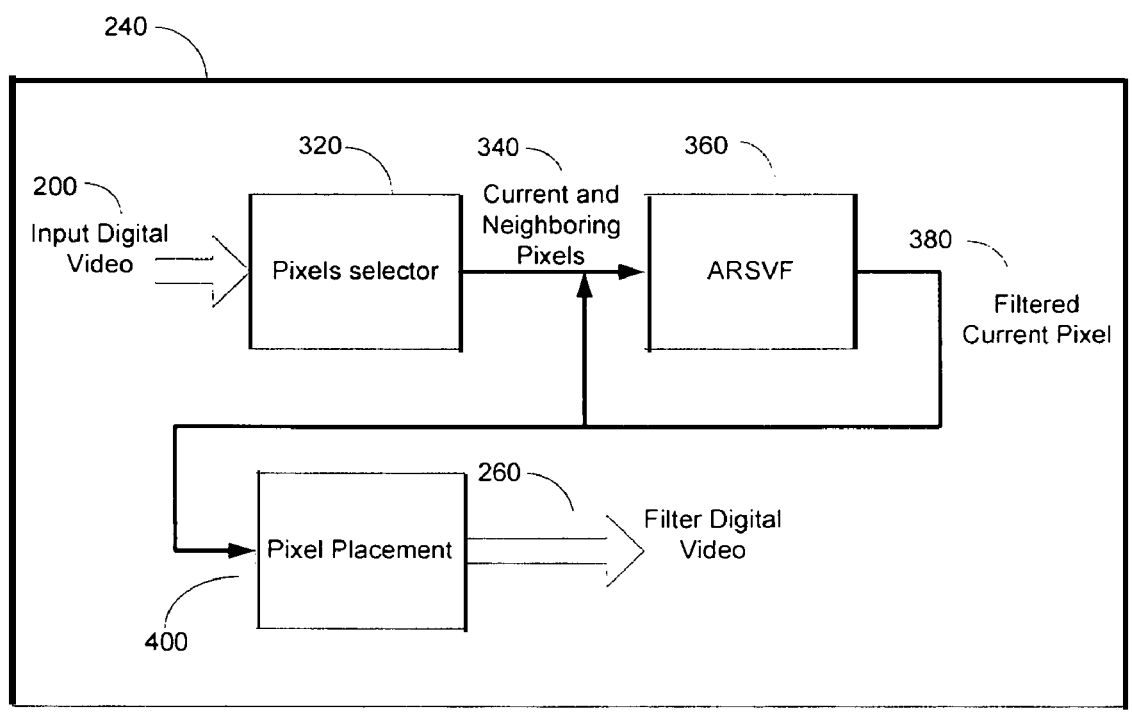
FIG. 2 details the pre-processing module of the video compression system of FIG. 1.

FIG. 2 further details pre-processing module 240. As shown, it includes a pixel selector 320, an auto-regressive spatial varying filter (ARSVF) 360 and a pixel placement sub-module 400. The pixels are selected in raster scan order. The pixels selector selects current and neighboring pixels from the input digital video 200 and passes them to ARSVF 360. ARSVF 360 performs filtering on the pixel and the result is placed back to the original spatial location by Pixel Placement module 400. ARSVF as well as other components of the pre-processing module 240 may be implemented in hardware, software or combination of both.

Figure 3:
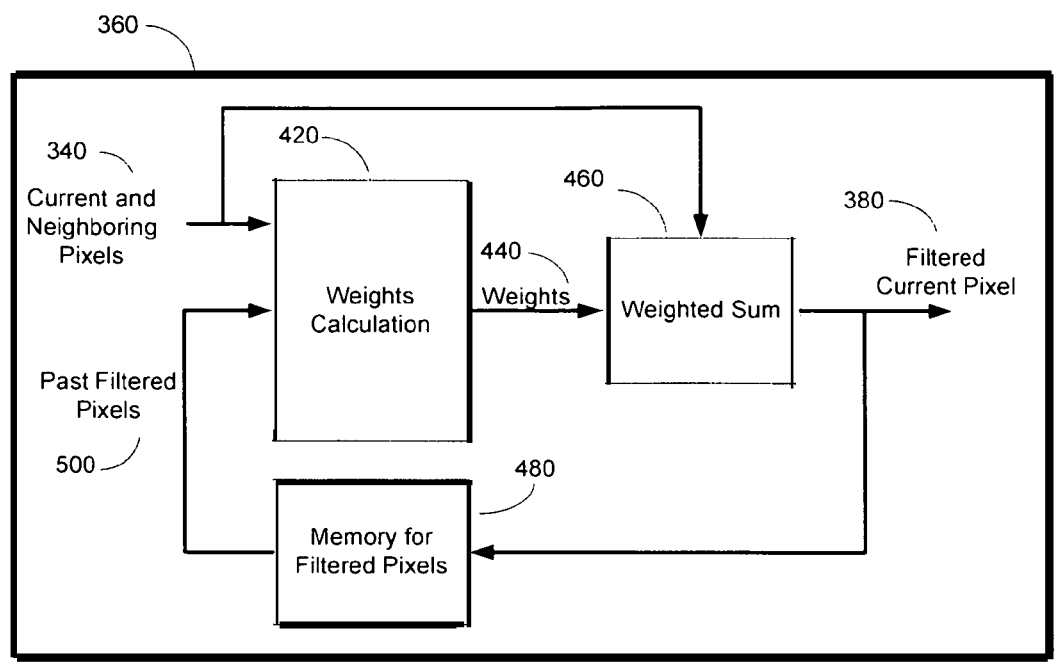
FIG. 3 is a block diagram of an exemplary ARSVF.

FIG. 3 is a block diagram of an exemplary ARSVF 360. The ARSVF includes a weight calculation module 420, a memory module for filtered pixels 480 and a weighted sum module 460. Filtered current pixel 380 is the weighted sum of a past filtered pixel 500 and neighboring pixels 340. Weight 440 is calculated by weight calculation module 420, and is determined based on the difference between the past filtered pixels and unfiltered future neighboring pixels. The filtered current pixel is then stored in the memory 480 for computing the weight of the next pixel.

Figure 4:
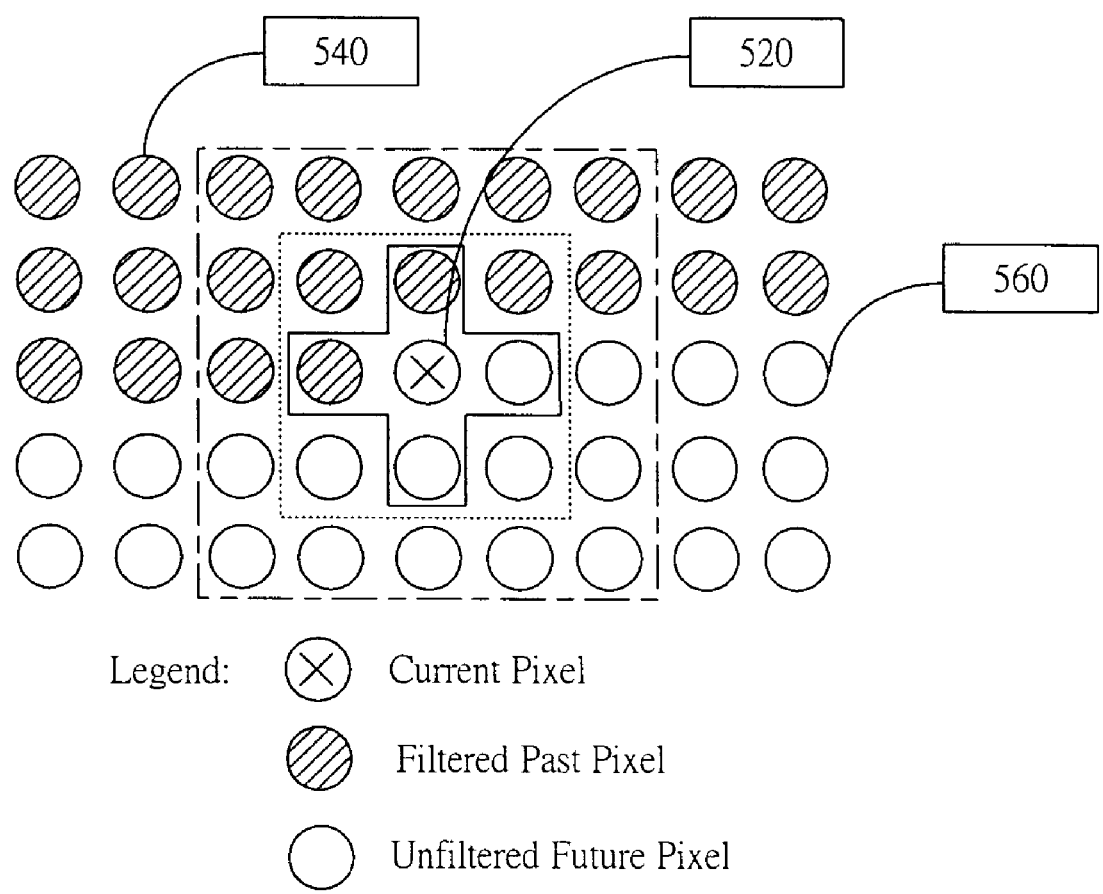
FIG. 4 shows three exemplary pixel matrices as the neighboring pixel for weight calculation in ARSVF.

FIG. 4 shows three exemplary pixel matrices or masks which define the pixels to be included in the neighboring pixels for weight calculation module 420 (FIG. 3) to generate weight 440. The pixel matrix is then used together with past filtered pixels in the weighted sum module 460 to generate the value for filtered current pixel 380. An increase in the window size of the pixel matrix generally produces a higher low-pass effect with higher computation complexity. Shaded pixel 540 in FIG. 4 represent filtered past pixels and un-shaded pixels 560 represent unfiltered future pixels. Pixel 520 is the current pixel. Filtered past pixel 540 and unfiltered future pixel 560 inside the matrix will be used to filter the current pixel 520 as neighboring pixels in ARSVF.

Modified Auto-Regressive Spatial Varying Filter (MARSVF)

A full implementation using equations 5, 6 and 7 should achieve optimal result, but it is computation exhaustive. Therefore, as another aspect of the present system and method there is provided a modified ARSVF or MARSVF, which is a sub-optimal solution but can be efficiently computed.

The objective of MARSVF is to reduce the computation of ARSVF. To that end, the equations used in ARSVF described in the foregoing are modified to achieve better computation efficiency with little or no decrease in filtering quality.

The weighting function, Equation (4), is modified in MARSVF as follows $$f'''(i) = 2^{-i} \quad (8)$$

where: "i" is the absolute difference between the truncated intensity of current pixel and the input candidate. In certain embodiments the pixel difference calculation in ARSVF is an 8-bit operation. MARSVF uses a truncated pixel value which is 5 bits for calculation so that the new difference, which is the input for Equation (8), is as follows:

$$\text{new\_diffi} = ABS(\text{pixel(center)} \!>\!\!> \!3 - \text{pixel}(i) \!>\!\!> \!3) \quad (9)$$

To further increase the efficiency, the computation of subtract and absolute operation in Equation (9) may be eliminated. The absolute difference can be obtained by means of a lookup table. The lookup table has two entries, one is the truncated (5 bits) current pixel value and one is the truncated candidate value (5 bits) such that the table size is 32 by 32. Since the total level of absolute difference equals 32 in Equation (9), the weighting function in Equation (8) is quantized to have an estimated weighting function:

$$f_{est}(i) = \lfloor 32 * 2^{-i} \rfloor \quad (10)$$

Figure 6:
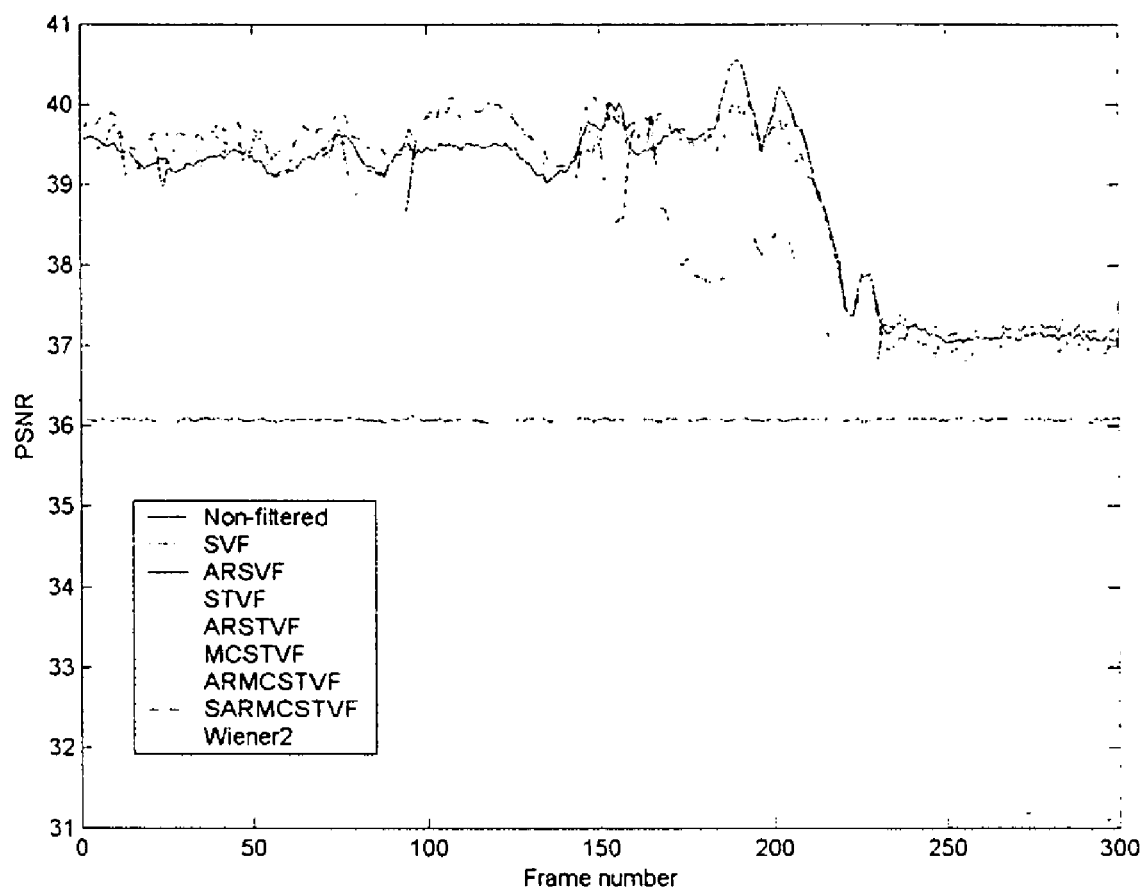
FIG. 6 shows PNSR of filtered video sample "Foreman" using various filters.

FIG. 6 shows the comparison between the weighting curve using original Equation (4) and the estimated weighting curve using Equation (10). If more precision is needed for Equation (9), a larger table size may be employed so that Equation (10) may produce smoother estimated functional curve, which however will come with a trade-off of an increased table size.

The division computation in Equation (7), may be eliminated by using the right shifting function. This requires that the normalization factor needs to be a power of 2. There are two ways to achieve this goal: adaptive and non-adaptive.

Non-adaptive normalization basically is accomplished by setting the normalization factor as a constant value, which in this exemplary implementation is set to be 128. If the actual sum of weight is larger than 128, the difference between the sum of weights and 128 is subtracted from the weight of current pixel (or the center pixel) such that:

$$\text{Weight}_{center} = 128 - \text{sum of weight of 8 connected neighbors}$$

The current filtered pixel will be equal to:

$$p' = \left( \sum_{i=0}^{8} p(i) * w(i) \right) \gg 7 \quad (11)$$

where:

p' is the filtered pixel;

p(i) is the 9 pixels within the window of the current pixel; and w(i) is the weight for that particular pixel.

For adaptive normalization, the normalization factor is still a power of two but, instead of using a fixed value, it is set to a value which is a power of two and this value is slightly larger than the sum of weight of 9 pixels. The process of obtaining the value is as follows:

1) Use a lookup table to find the maximum level of the most significance bit (MSB) of the first input value. This will give the index for the normalization factor.

2) Initialize accumulated weight (sum_acc), making it equal to the first input value.

3) Each input value will be added to the sum_acc, which will then be right shifted by the maximum level of MSB. If the output equals to 1, the maximum level of MSB will be incremented by one.

4) After all the weight of candidate is added, the maximum level of MSB of the sum of weight is obtained. The normalization factor equals to right shifting (>>) with amount of (maximum level of MSB+1). As a result, the filtered pixel equals:

$$p' = \left( \sum_{i=0}^{8} p(i) * w(i) \right) \gg (\max MSB + 1) \quad (12)$$

where:

p' is the filtered pixel;

p(i) is the 9 pixels within the window of the current pixel;

w(i) is the weight for that particular pixel; and max MSB is the maximum level of most significance bit.

Spatiotemporal Varying Filter (STVF)

This filter was proposed by Tai-Wai Chan; Au, O. C.; Tak-Song Chong; Wing-San Chau; "A novel content-adaptive video denoising filter," in Proceedings (ICASSP '05) IEEE International Conference on Acoustics, Speech, Volume 2, 18-23 March 2005, Pages 649-652.

STVF extends SVF to the temporal domain by including the pixels in previous frame and next frames in order to exploit the temporal redundancy for noise suppression. Denoting $x_{t-1}(i,j)$, $x_t(i,j)$, $x_{t+1}(i,j)$ as the $(i,j)^{th}$ pixel in $t-1$, $t$ and $t+1$ frame respectively where $t$ is the current frame, the filtered output $y_t(i, j)$ is given by Equations (13)-(15). Because one frame delay is introduced when STVF is used, to avoid the delay, Equation (13) can be modified so that only the current frame and previous one are used to filter the frame.

$$y_t(i, j) = \sum_{(k,l) \in N} a_{t,t-1}(i+k, j+l) \cdot x_{t-1}(i+k, j+l) + \qquad (13)$$

$$\sum_{(k,l) \in N} a_{t,t}(i+k, j+l) \cdot x_t(i+k, j+l) +$$

$$\sum_{(k,l) \in N} a_{t,t+1}(i+k, j+l) \cdot x_{t+1}(i+k, j+l)$$

$$w_{t,t+s}(i+k, j+l) = f(|x_t(i, j) - x_{t+s}(i+k, j+l)|) \qquad (14)$$

$$a_{t,t+s}(i+k, j+l) = \frac{w_{t,t+s}(i+k, j+l)}{\sum_{s=-1}^{1} \sum_{(k,l) \in N} w_{t,t+s}(i+k, j+l)} \qquad (15)$$

Auto-Regressive Spatiotemporal Varying Filter (ARSTVF)

As another embodiment of the present method and system, STVF and ARSVF are combined to give ARSTVF and the filtered pixel is given by Equations (16)-(18).

$$y_t(i, j) = \sum_{(k,l) \in N} a_{t,t-1}(i+k, j+l) \cdot y_{t-1}(i+k, j+l) + \qquad (16)$$

$$\sum_{\substack{(k,l) \in N, \\ (k,l) < (0,0)}} a_{t,t}(i+k, j+l) \cdot y_t(i+k, j+l) +$$

$$\sum_{\substack{(k,l) \in N, \\ (k,l) \geq (0,0)}} a_{t,t}(i+k, j+l) \cdot x_t(i+k, j+l) +$$

$$\sum_{(k,l) \in N} a_{t,t+1}(i+k, j+l) \cdot x_{t+1}(i+k, j+l)$$

$$w_{t,t+s}(i+k, j+l) = \qquad (17)$$
$$\begin{cases} f(|x_t(i, j) - y_{t+s}(i+k, j+l)|), & s = -1 \\ f(|x_t(i, j) - y_{t+s}(i+k, j+l)|), & s = 0, (k,l) < (0, 0) \\ f(|x_t(i, j) - x_{t+s}(i+k, j+l)|), & s = 0, (k,l) \geq (0, 0) \\ f(|x_t(i, j) - x_{t+s}(i+k, j+l)|), & s = 1 \end{cases}$$

$$a_{t,t+s}(i+k, j+l) = \frac{w_{t,t+s}(i+k, j+l)}{\sum_{s=-1}^{1} \sum_{(k,l) \in N} w_{t,t+s}(i+k, j+l)} \qquad (18)$$

Motion Compensated Spatiotemporal Varying Filter (MCSTVF)

In MCSTVF, motion information is used to compensate the motion effect in the filtering process. In general, the motion information for every pixel should be estimated. However, the complexity needed to estimate the motion information for every pixel is too large for real-time video processing. To reduce the complexity, block based motion estimation is used. However, other higher complexity techniques may also be used to provide better results. For example, a pixel based motion estimation technique, like optical flow, may produce a better result. Therefore, temporal direction pixel matching is not limited to block based motion estimation. Denoting $mvx_{t,t-l}(i, j)$, $mvy_{t,t-l}(i, j)$ as the x-component and y-component of the motion vector for the $(i, j)^{th}$ pixel in current frame $t$, with reference to previous frame $t-1$, the filtered pixel is given by Equations (19)-(21).

$$y_t(i, j) = \sum_{(k,l) \in N} a_{t,t-1}(i+k, j+l) \cdot x_{t-1} \qquad (19)$$

$$(i+k+mvx_{t,t-1}(i, j), j+l+mvy_{t,t-1}(i, j)) +$$

$$\sum_{(k,l) \in N} a_{t,t}(i+k, j+l) \cdot x_t(i+k, j+l) + \sum_{(k,l) \in N} a_{t,t+1}(i+k, j+l) \cdot$$

$$x_{t+1}(i+k+mvx_{t,t+1}(i, j), j+l+mvy_{t,t+1}(i, j))$$

$$w_{t,t+s}(i+k, j+l) = \qquad (20)$$
$$f(|x_t(i, j) - x_{t+s}(i+k+mvx_{t,t+s}(i, j), j+l+mvy_{t,t+s}(i, j))|),$$

$$a_{t,t+s}(i+k, j+l) = \frac{w_{t,t+s}(i+k, j+l)}{\sum_{s=-1}^{1} \sum_{(k,l) \in N} w_{t,t+s}(i+k, j+l)} \qquad (21)$$

Auto-Regressive Motion Compensated Spatiotemporal Varying Filter (ARMCSTVF)

As another embodiment of the present method and system, MCSTVF is modified to become a recursive filter, referred to as ARMCSTVF. The filtered pixel via ARMCSTVF is given by Equations (22)-(24).

$$y_t(i, j) = \sum_{(k,l) \in N} a_{t,t-1}(i+k, j+l) \cdot \qquad (22)$$

$$y_{t-1}(i+k+mvx_{t,t-1}(i, j), j+l+mvy_{t,t-1}(i, j)) +$$

$$\sum_{\substack{(k,l) \in N, \\ (k,l) < (0,0)}} a_{t,t}(i+k, j+l) \cdot y_t(i+k, j+l) +$$

$$\sum_{\substack{(k,l) \in N, \\ (k,l) \geq (0,0)}} a_{t,t}(i+k, j+l) \cdot x_t(i+k, j+l) + \sum_{(k,l) \in N} a_{t,t+1}(i+k, j+l) \cdot$$

$$x_{t+1}(i+k+mvx_{t,t+1}(i, j), j+l+mvy_{t,t+1}(i, j))$$

$$w_{t,t+s}(i+k, j+l) = \qquad (23)$$

$$\begin{cases} f(|x_t(i, j) - y_{t+s}(i+k+mvx_{t,t+s}(i, j), j+l+ \\ \qquad mvy_{t,t+s}(i, j))|), & s = -1 \\ f(|x_t(i, j) - y_{t+s}(i+k+mvx_{t,t+s}(i, j), j+l+ \\ \qquad mvy_{t,t+s}(i, j))|), & s = 0, (k,l) < (0, 0) \\ f(|x_t(i, j) - x_{t+s}(i+k+mvx_{t,t+s}(i, j), j+l+ \\ \qquad mvy_{t,t+s}(i, j))|), & s = 0, (k,l) \geq (0, 0) \\ f(|x_t(i, j) - x_{t+s}(i+k+mvx_{t,t+s}(i, j), j+l+ \\ \qquad mvy_{t,t+s}(i, j))|), & s = 1 \end{cases}$$

-continued $$a_{t,t+s}(i+k, j+l) = \frac{w_{t,t+s}(i+k, j+l)}{\sum_{s=-1}^{1}\sum_{(k,l)\in N} w_{t,t+s}(i+k, j+l)} \quad (24)$$

Selective Auto-Regressive Motion Compensated Spatiotemporal Varying Filter (SARMCSTVF)

It is observed that for some frames with large object motions or camera movement, the noise suppression capability of MCSTVF is inferior to STVF. In contrast, for frames with small motion regions, ARMCSTVF is better than ARSTVF. Those observations are taken into consideration in another embodiment of the present method and system where a condition is defined to switch between ARSTVF and ARMCSTVF. For any pixel, if either the absolute magnitude of the x-component or y-component is smaller than or equal to a threshold value, ARMCSTVF is used for this pixel and otherwise ARSTVF is used. For one particular embodiment described here, the threshold value is set to 4, but the value can be adjusted or adaptively calculated. Thus, people of ordinary skill in the art may modify the switching condition to suit their specific needs. The specified switching condition provided here is by example only. This filter is referred to as SARMCSTVF or Selective Auto-regressive Motion Compensated Spatiotemporal Varying Filter, which is based on Equations (25) and (26).

$$mvx_{t,t-s}(i, j) = \begin{cases} mvx_{t,t-s}(i, j), & |mvx_{t,t-s}(i, j)| \leq 4 \\ 0, & \text{otherwise} \end{cases} \quad (25)$$

$$mvy_{t,t-s}(i, j) = \begin{cases} mvy_{t,t-s}(i, j), & |mvx_{t,t-s}(i, j)| \leq 4 \\ 0, & \text{otherwise} \end{cases} \quad (26)$$

Referring to Table 1, two testing video sequences "Foreman" and "Akiyo," which were in CIF 4:2:0 format (352 by 288 pixels for luminance, 176 by 144 pixels for chrominance), were used in a testing with the denoising filters listed in Table 1. Gaussian noise with variances=16 was added to the luminance component of the testing videos. SVF and the built-in 2-D Wiener filter (a product under the trademark "Matlab") are used as references along with various filters according to the present method and system. The testing was running on a PC using Matlab for simulation.

Figure 7:
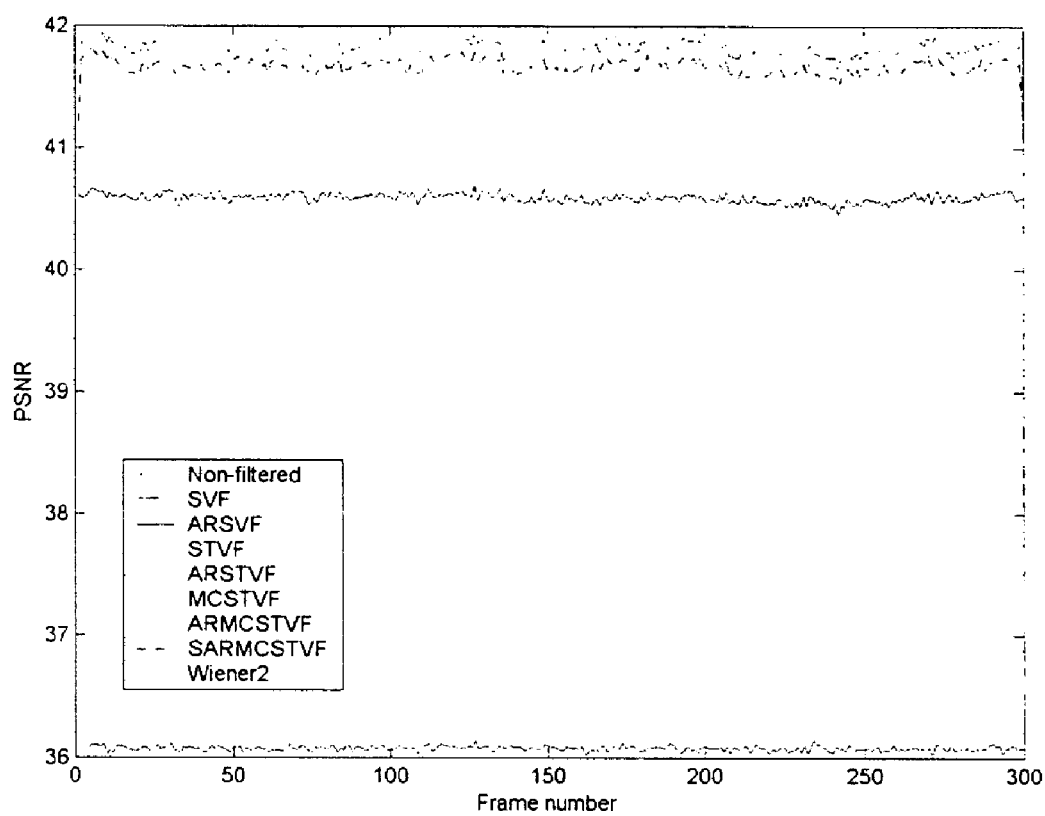
FIG. 7 shows PNSR of filtered video sample "Akiyo" using various filters.
Figure 8:
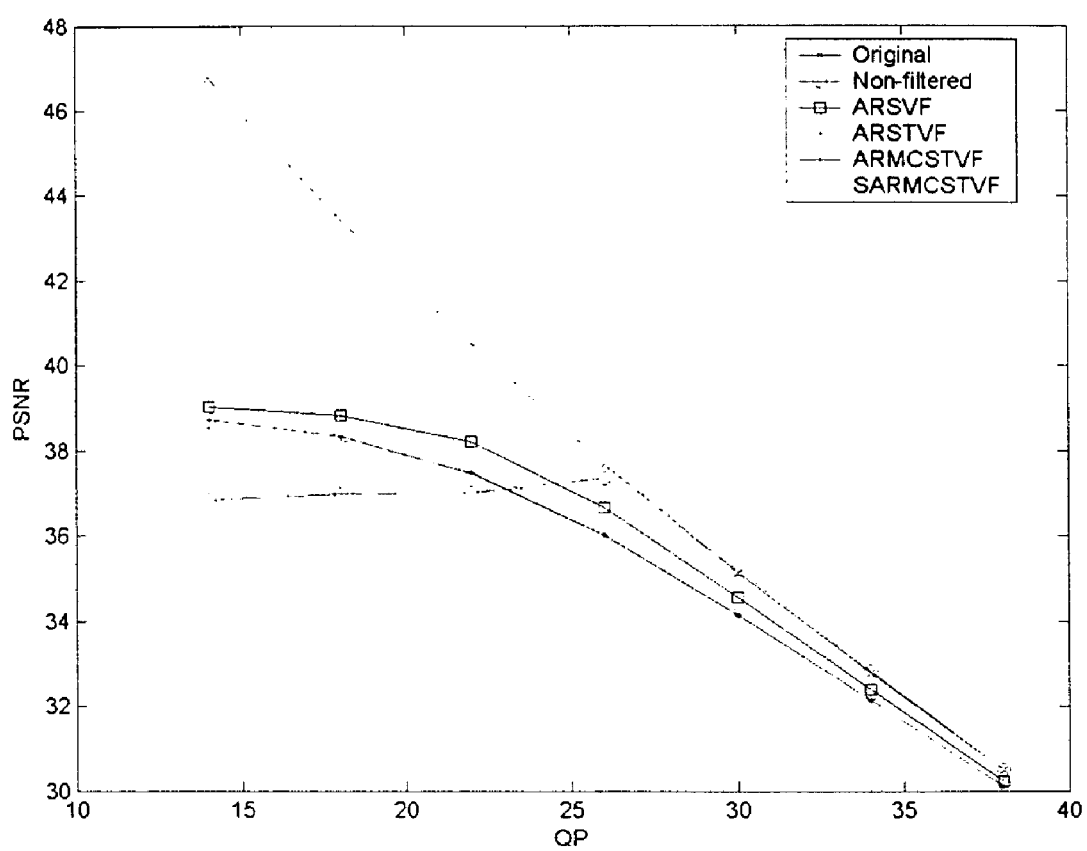
FIG. 8 shows PSNR of H.264 compressed video sample "Foreman".
Figure 9:
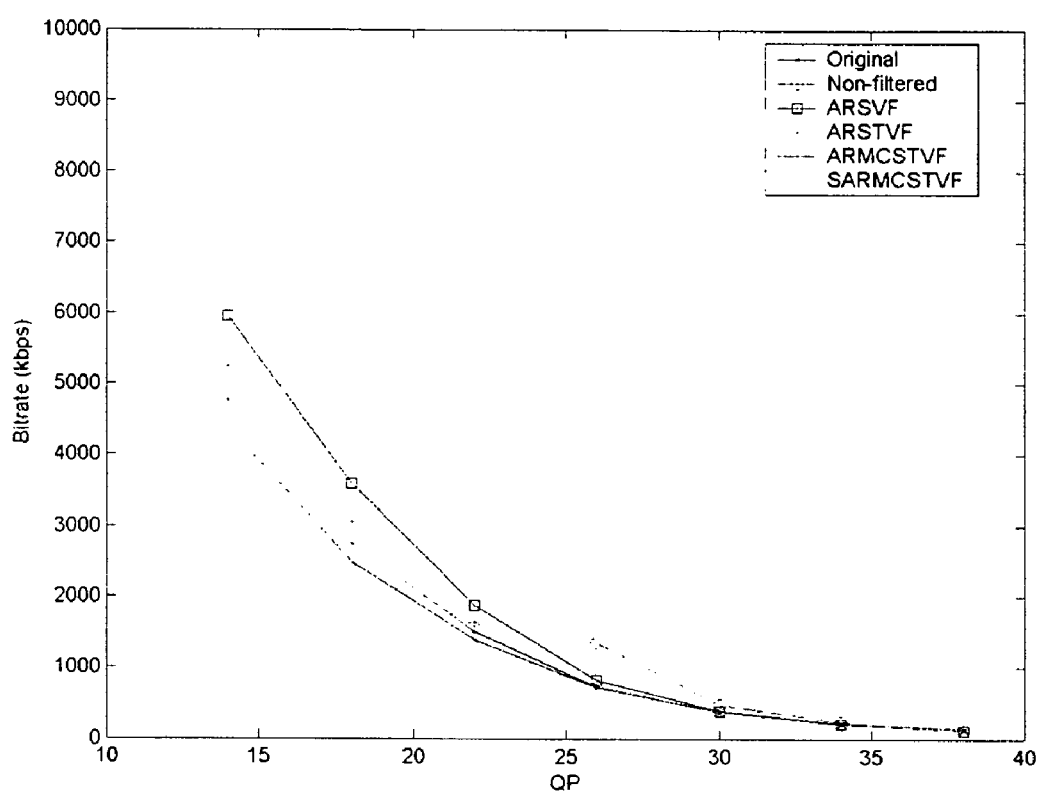
FIG. 9 shows Bitrate of the same compressed video sample as in FIG. 8.
Figure 10:
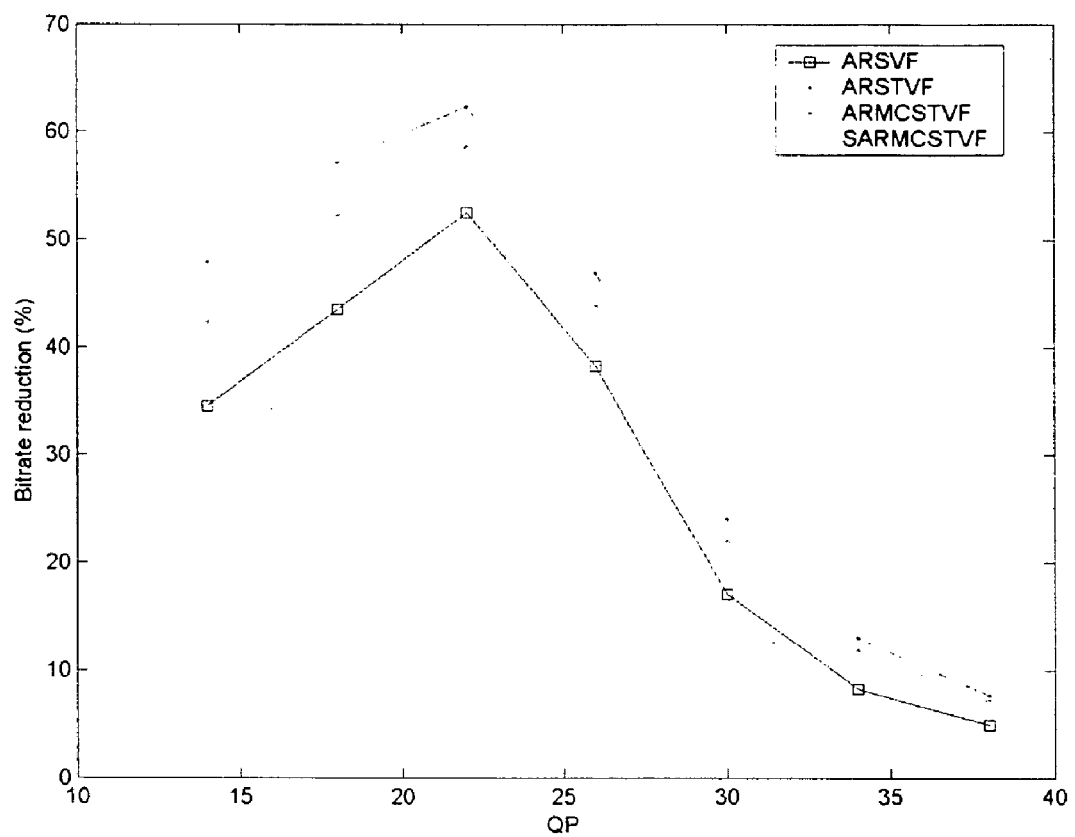
FIG. 10 shows Bitrate reduction using various filters for video sample "Foreman"
Figure 11:
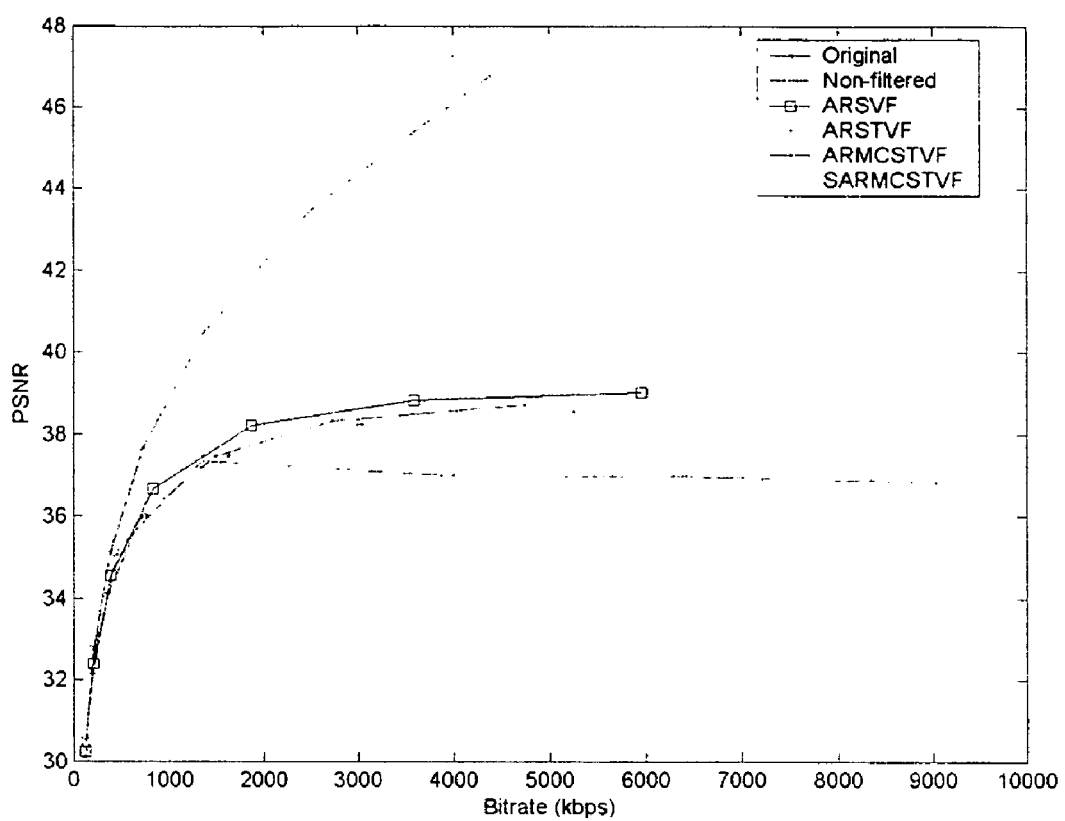
FIG. 11 shows Rate-distortion curve of video sample "Foreman".
Figure 12:
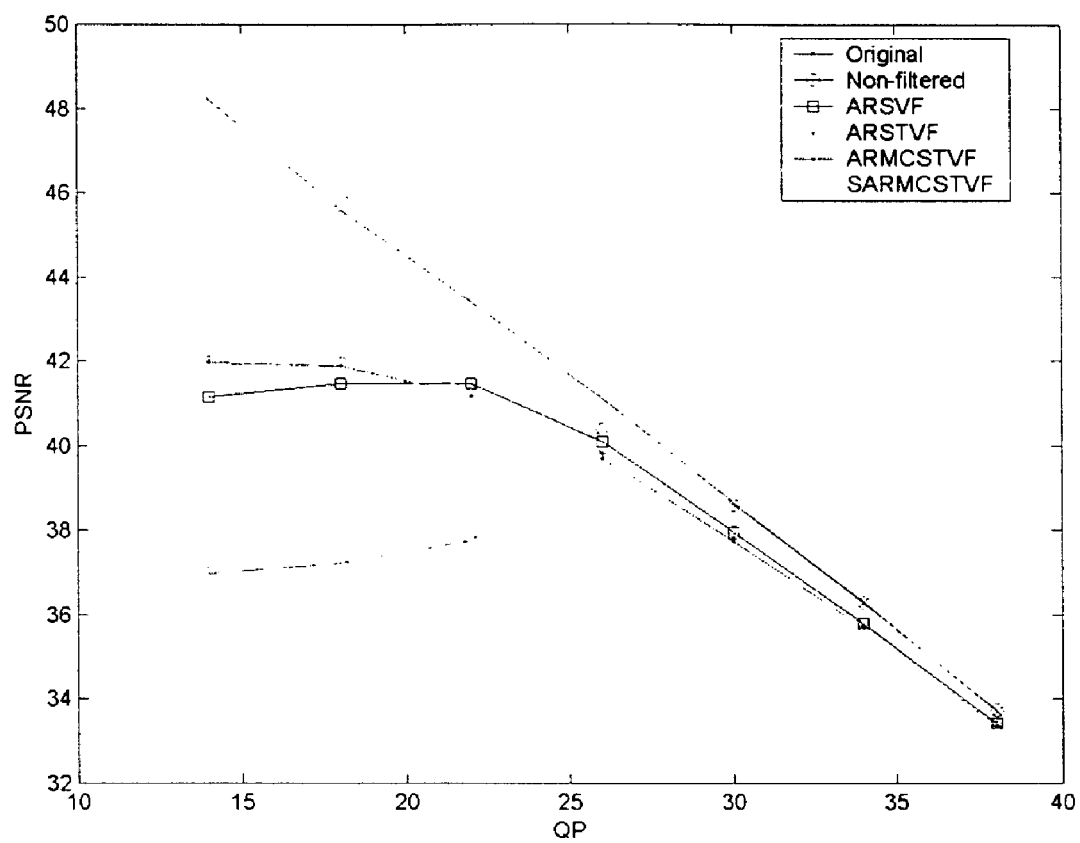
FIG. 12 shows PSNR of H.264 compressed video sample "Akiyo".
Figure 13:
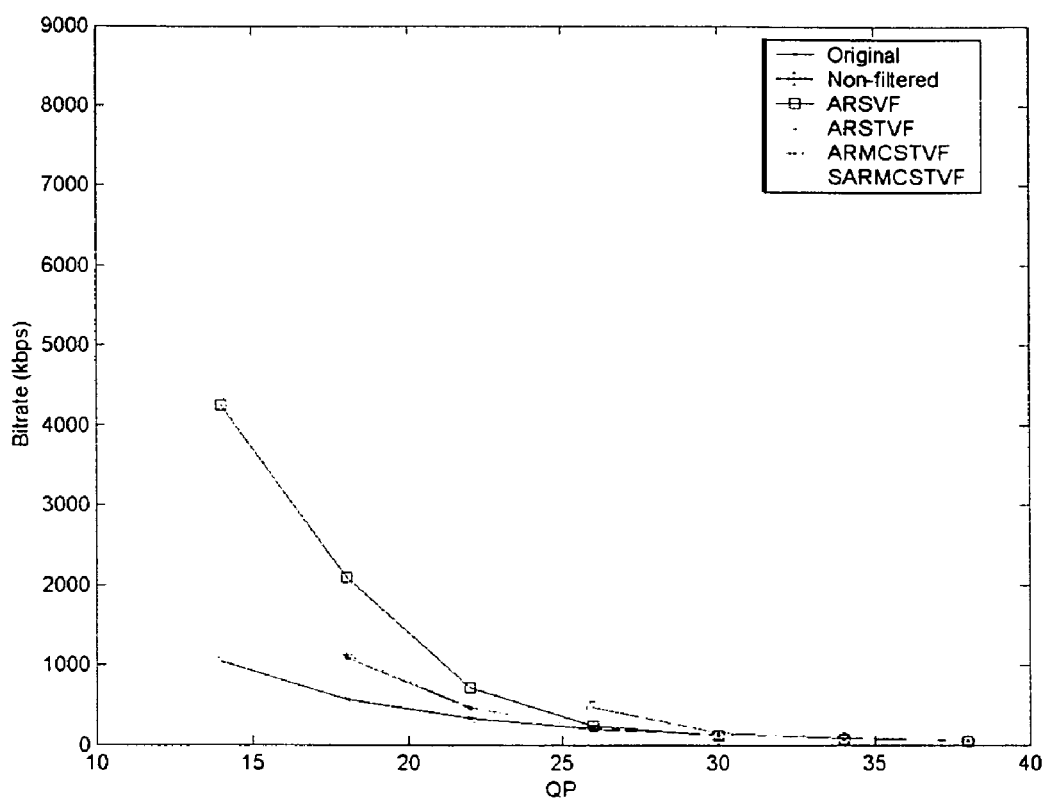
FIG. 13 shows Bitrate of H.264 compressed video sample "Akiyo".
Figure 14:
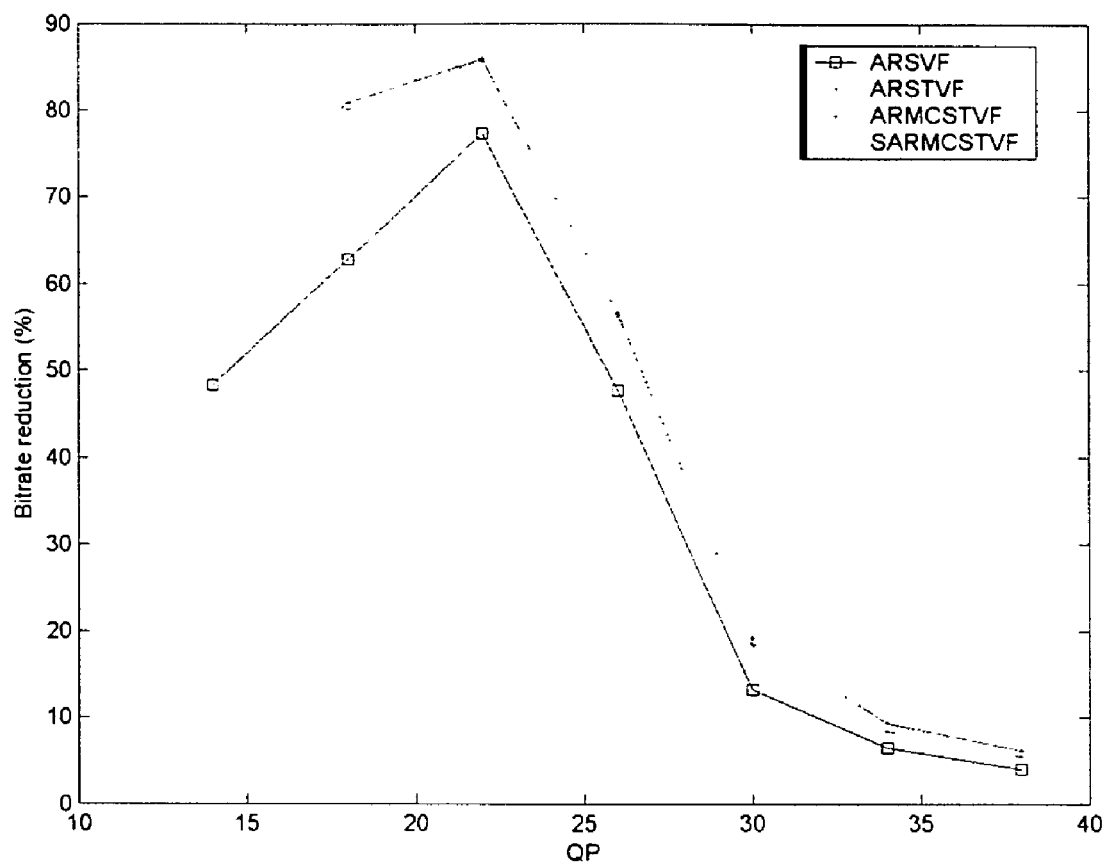
FIG. 14 shows Bitrate reduction using various filters for video sample "Akiyo".
Figure 15:
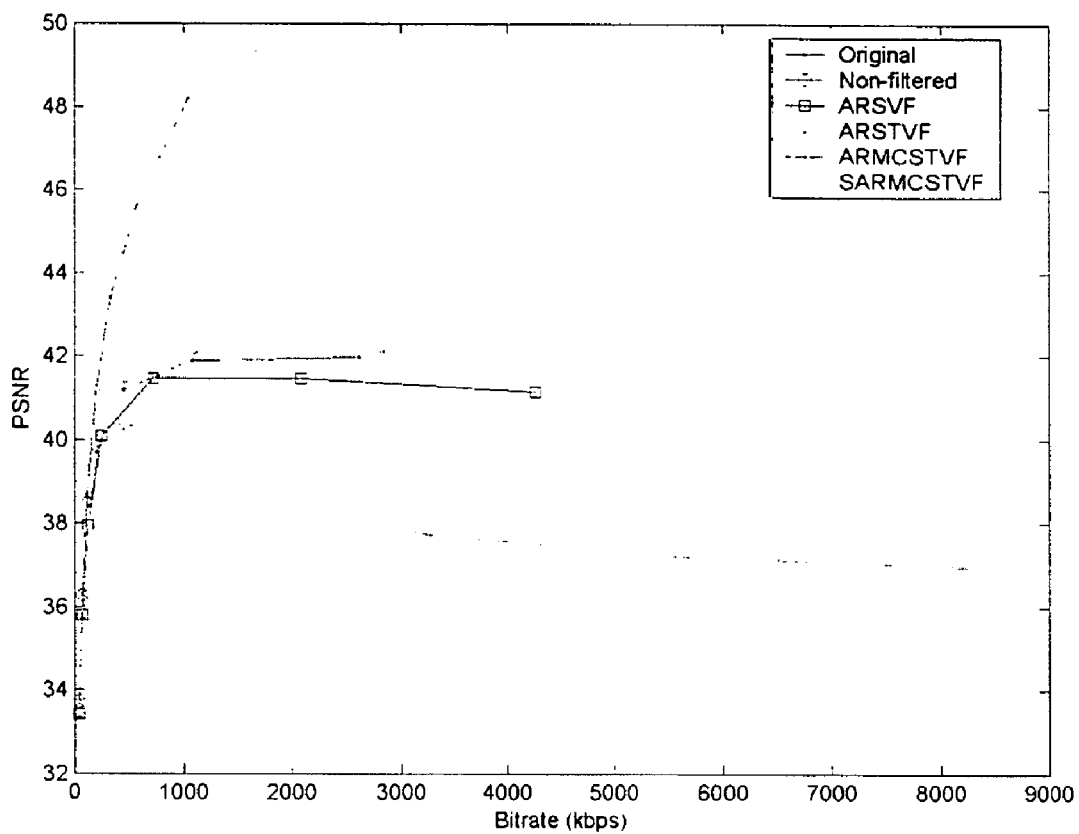
FIG. 15 shows Rate-distortion curve of video sample "Akiyo".

8-connected spatial neighboring pixels are chosen as the input of the filter, e.g., that the set of neighboring pixels N is {(−1,−1), (−1,0), (−1,1), (0,−1), (0,0), (0,1), (1,−1), (1,0), (1,1)}. If temporal filtering is included, pixels in past or future frames should be included. The Peak Signal-to-Noise-Ratio (PSNR) using different filters are shown in FIG. 6 and FIG. 7 for 'Foreman' and 'Akiyo,' respectively. The frame-wise average PSNR is shown in Table 1. For 'Foreman,' the noise suppression performance is good from frame 1 to frame 180 because there is less or even no camera and object motion (high temporal redundancy), the video segment also contains many smooth regions (high spatial redundancy). It is noted that the performance of spatial-temporal filters was better than spatial filters in this video segment. From frame 181 to frame 220, the performance of spatial-temporal filters is worse than spatial filters. It was observed that the motion field of this segment was chaotic which implies the accuracy of motion estimation was very low. This would introduce inaccurate temporal candidates for the filtering process. This problem was alleviated when SARMCSTVF was used. The resulted PSNR from SARMCSTVF was closed to ARSVF. From frame 221 to frame 300, the video segment was highly textured (low spatial redundancy) that limits the performance of filters.

For Akiyo, the general performance of the filters were very good since there was high spatial as well as temporal redundancy.

TABLE 1

AVERAGE PSNR OF FILTERED VIDEO

|  | Foreman | Akiyo |
|---|---|---|
| Non Filtered | 36.07 dB | 36.07 dB |
| SVF | 38.82 dB | 40.36 dB |
| ARSVF | 38.85 dB | 40.59 dB |
| STVF | 38.66 dB | 41.67 dB |
| ARSTVF | 38.52 dB | 41.81 dB |
| MCSTVF | 39.12 dB | 41.56 dB |
| ARMCSTVF | 38.81 dB | 41.74 dB |
| SARMCSTVF | 38.93 dB | 41.66 dB |
| Wiener2 | 35.60 dB | 39.85 dB |

The filtered testing video was then compressed using H.264/AVC reference software JM6.1e with difference QP ranging 14 to 38. The GOP size was 15 frames and the GOP structure was IPPPPPPPPPPPPPP. The multi-block was employed and the multi-frame function was switched off. Average PSNR, bit-rate reduction and rate-distortion curves are shown in FIGS. 8-15. In the term of rate-distortion optimization, ARSVF had the best performance and SARMCSTVF had the second best performance. In the term of bit-rate reduction, ARMCSTVF and SARMCSTVF both had good performance.

Although the foregoing embodiments focused on video denoising filtering, the concept of autoregressive filtering where filtered pixels are used as an input for filtering the current pixel, an important aspect of the present method and system, can be equally applicable to the images. In essence, an image is very much like a single frame of a video. Of course, filters that use temporal information are not applicable to individual images as there is not temporal information. The denoising method of the present invention can be computationally implemented in software, hardware, or combination of both. Such computational implementation, either in the form of a software application or integrated circuits of a semiconductor chip or combination thereof, is within ordinary skill in the art.

While there have been described and pointed out fundamental novel features of the invention as applied to a preferred embodiment thereof, it will be understood that various omissions and substitutions and changes, in the form and details of the embodiments illustrated, may be made by those skilled in the art without departing from the spirit of the invention. The invention is not limited by the embodiments described above which are presented as examples only but can be modified in various ways within the scope of protection defined by the appended patent claims.

What is claimed is:

1. A method for denoising a digital image or a digital video containing at least one video frame, comprising producing a filtered output for a current pixel of said digital image or video frame using a past filtered pixel as an input, said filtered output being a weighted sum of said past filtered pixel and a set of neighboring pixels which comprises one or more future pixels surrounding said current pixel, said weighted sum being calculated by applying a spatial varying filter coefficient, wherein said weighted sum is calculated according to Equation (5);

$$y(i, j) = \sum_{\substack{(k,l) \in N, \\ (k,l) < (0,0)}} a(i+k, j+l) \cdot y(i+k, j+l) + \qquad (5)$$

$$\sum_{\substack{(k,l) \in N, \\ (k,l) \geq (0,0)}} a(i+k, j+l) \cdot x(i+k, j+l)$$

$$w(i+k, j+l) = \begin{cases} f(|x(i, j) - y(i+k, j+l)|), & (k, l) < (0, 0) \\ f(|x(i, j) - x(i+k, j+l)|), & (k, l) \geq (0, 0) \end{cases} \qquad (6)$$

$$a(i+k, j+l) = \frac{w(i+k, j+l)}{\sum_{(k,l) \in N} w(i+k, j+l)} \qquad (7)$$

where, y(i,j) is weighted sum of the input; x(i,j) is (i,j)th pixel of said digital image or video frame; a(i+k, j+l) is said spatial varying filter coefficient determined by a function $f$ of absolute pixel difference defined by Equation (6) and normalized by Equation (7); and N is said set of neighboring pixels.

2. The method of claim 1, wherein said set of neighboring pixels are defined by a predetermined pixel pattern encompassing a plurality of filtered past pixels and unfiltered future pixels.

3. The method of claim 1, wherein said $f$ is modified as $f'''$ according to Equation (8):

$$f'''(i) = 2^{-1} \qquad (8)$$

4. The method of claim 3, wherein said $f$ is approximated by Equation 10:

$$f_{est}(i) = [32 * 2^{-1}] \qquad (10)$$

5. A method for denoising a digital image or a digital video containing at least one video frame, comprising producing a filtered output for a current pixel of said digital image or video frame using a past filtered pixel as an input, said filtered output being a weighted sum of said past filtered pixel and a set of neighboring pixels which comprises one or more future pixels surrounding said current pixel, said weighted sum being calculated by applying a spatial varying filter coefficient, wherein a division in Equation (7) is replaced by a non-adaptive normalization method so that output for current pixel is calculated by a simpler Equation (11):

$$a(i+k, j+l) = \frac{w(i+k, j+1)}{\sum_{(k,l) \in N} w(i+k, j+l)} \qquad (7)$$

$$p' = \left( \sum_{i=0}^{8} p(i) * w(i) \right) \gg 7 \qquad (11)$$

where p' is the filtered pixel
p(i) is the 9 pixels within the window of the current pixel
w(i) is the weight for that particular pixel.

6. A method for denoising a digital image or a digital video containing at least one video frame, comprising producing a filtered output for a current pixel of said digital image or video frame using a past filtered pixel as an input, said filtered output being a weighted sum of said past filtered pixel and a set of neighboring pixels which comprises one or more future pixels surrounding said current pixel, said weighted sum being calculated by applying a spatial varying filter coefficient, wherein a division in Equation (7) is replaced by an adaptive normalization method so that output for current pixel is calculated by simpler Equation (12):

$$a(i+k, j+l) = \frac{w(i+k, j+1)}{\sum_{(k,l) \in N} w(i+k, j+l)} \qquad (7)$$

$$p' = \left( \sum_{i=0}^{8} p(i) * w(i) \right) \gg (\max MSB + 1) \qquad (12)$$

where: p' is the filtered pixel;
p(i) is the 9 pixels within the window of the current pixel;
w(i) is the weight for that particular pixel; and
max MSB is the maximum level of most significance bit.

7. A method for denoising a digital image or a digital video containing at least one video frame, comprising producing a filtered output for a current pixel of said digital image or video frame using a past filtered pixel as an input, said filtered output being a weighted sum of said past filtered pixel and a set of neighboring pixels which comprises one or more future pixels surrounding said current pixel, said weighted sum being calculated by applying a spatial varying filter coefficient, wherein said method is applicable to a digital video comprising at least a previous frame, a current frame and a next frame, and said set of neighboring pixels contains at least one pixel from said previous frame in producing a filtered output for a current pixel of said current frame, wherein said filtered output for said current pixel of said current frame is calculated according to Equations (16)-(18):

$$y_t(i, j) = \sum_{(k,l) \in n} a_{t,t-1}(i+k, j+l) \cdot y_{t-1}(i+k, j+l) + \qquad (16)$$

$$\sum_{\substack{(k,l) \in N, \\ (k,l) < (0,0)}} a_{t,t}(i+k, j+l) \cdot y_t(i+k, j+l) +$$

$$\sum_{\substack{(k,l) \in N, \\ (k,l) \geq (0,0)}} a_{t,t}(i+k, j+l) \cdot x_t(i+k, j+l) +$$

$$\sum_{(k,l) \in N} a_{t,t+1}(i+k, j+l) \cdot x_{t+1}(i+k, j+l)$$

$$w_{t,t+s}(i+k, j+l) = \qquad (17)$$

$$\begin{cases} f(|x_t(i, j) - y_{t+s}(i+k, j+l)|), & s = -1 \\ f(|x_t(i, j) - y_{t+s}(i+k, j+l)|), & s = 0, (k, l) < (0, 0) \\ f(|x_t(i, j) - x_{t+s}(i+k, j+l)|), & s = 0, (k, l) \geq (0, 0) \\ f(|x_t(i, j) - x_{t+s}(i+k, j+l)|), & s = 1 \end{cases}$$

$$a_{t,t+s}(i+k, j+l) = \frac{w_{t,t+s}(i+k, j+l)}{\sum_{s=-1}^{1} \sum_{(k,l) \in N} w_{t,t+s}(i+k, j+l)} \qquad (18)$$

wherein t−1, t, and t+1 are said previous frame, current frame and next frame, respectively.

8. A method for denoising a digital image or a digital video containing at least one video frame, comprising producing a filtered output for a current pixel of said digital image or video frame using a past filtered pixel as an input, said filtered output being a weighted sum of said past filtered pixel and a set of neighboring pixels which comprises one or more future pixels surrounding said current pixel, said weighted sum being calculated by applying a spatial varying filter coefficient, wherein said filtered output for said current pixel of said current frame is calculated according to Equations (22)-(24):

$$y_t(i, j) = \sum_{(k,l) \in n} a_{t,t-1}(i+k, j+l) \cdot y_{t-1}(i+k+mvx_{t,t-1}(i, j), j+l+mvy_{t,t-1}(i, j)) + \qquad (22)$$

$$\sum_{\substack{(k,l) \in N, \\ (k,l)<(0,0)}} a_{t,t}(i+k, j+l) \cdot y_t(i+k, j+l) + \sum_{\substack{(k,l) \in N, \\ (k,l) \geq (0,0)}} a_{t,t}(i+k, j+l) \cdot x_t(i+k, j+l) +$$

$$\sum_{(k,l) \in N} a_{t,t+1}(i+k, j+l) \cdot x_{t+1}(i+k+mvx_{t,t+1}(i, j), j+l+mvy_{t,t+1}(i, j))$$

$$w_{t,t+s}(i+k, j+l) = \qquad (23)$$

$$\begin{cases} f(|x_t(i, j) - y_{t+s}(i+k+mvx_{t,t+s}(i, j), j+l+mvy_{t,t+s}(i, j))|), & s = -1 \\ f(|x_t(i, j) - y_{t+s}(i+k+mvx_{t,t+s}(i, j), j+l+mvy_{t,t+s}(i, j))|), & s = 0, (k, l) < (0, 0) \\ f(|x_t(i, j) - x_{t+s}(i+k+mvx_{t,t+s}(i, j), j+l+mvy_{t,t+s}(i, j))|), & s = 0, (k, l) \geq (0, 0) \\ f(|x_t(i, j) - x_{t+s}(i+k+mvx_{t,t+s}(i, j), j+l+mvy_{t,t+s}(i, j))|), & s = 1 \end{cases}$$

$$a_{t,t+s}(i+k, j+l) = \frac{w_{t,t+s}(i+k, j+l)}{\sum_{s=-1}^{1} \sum_{(k,l) \in N} w_{t,t+s}(i+k, j+l)} \qquad (24)$$

wherein t−1, t, and t+1 are said previous frame, current frame and next frame, respectively, $mvx_{t,t-1}(i,j)$, $mvy_{t,t-1}(i,j)$ are x-component and y-component of motion vector for the $(i,j)^{th}$ pixel in current frame t and previous frame t−1, respectively.

* * * * *

UNITED STATES PATENT AND TRADEMARK OFFICE
CERTIFICATE OF CORRECTION

| | |
|---|---|
| PATENT NO. | : 7,657,113 B2 |
| APPLICATION NO. | : 11/313421 |
| DATED | : February 2, 2010 |
| INVENTOR(S) | : Hon W. Wong et al. |

It is certified that error appears in the above-identified patent and that said Letters Patent is hereby corrected as shown below:

Column 4, Equation 5, Line 58, delete the portion of the equation reading "$(k,l)<(0,0)$" and replace with --$(k,l)\geq(0,0)$--.

Signed and Sealed this

Twenty-third Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,657,113 B2
APPLICATION NO. : 11/313421
DATED : February 2, 2010
INVENTOR(S) : Wong et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1077 days.

Signed and Sealed this

Thirtieth Day of November, 2010

David J. Kappos
*Director of the United States Patent and Trademark Office*